US011298828B2

(12) United States Patent
Nammoto et al.

(10) Patent No.: US 11,298,828 B2
(45) Date of Patent: Apr. 12, 2022

(54) CALIBRATION DEVICE, CALIBRATION METHOD, AND CONTROL DEVICE

(71) Applicant: Mitsubishi Electric Corporation, Tokyo (JP)

(72) Inventors: Takashi Nammoto, Tokyo (JP); Koji Shiratsuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 140 days.

(21) Appl. No.: 16/846,046

(22) Filed: Apr. 10, 2020

(65) Prior Publication Data
US 2020/0238526 A1 Jul. 30, 2020

Related U.S. Application Data

(63) Continuation of application No. PCT/JP2017/039765, filed on Nov. 2, 2017.

(51) Int. Cl.
*B25J 9/16* (2006.01)
*B25J 13/08* (2006.01)
*B25J 19/02* (2006.01)

(52) U.S. Cl.
CPC .......... *B25J 9/1692* (2013.01); *B25J 9/161* (2013.01); *B25J 9/163* (2013.01); *B25J 9/1648* (2013.01);
(Continued)

(58) Field of Classification Search
CPC . B25J 9/1692; B25J 9/161; B25J 9/163; B25J 9/1648; B25J 9/1694; B25J 13/085;
(Continued)

(56) References Cited

U.S. PATENT DOCUMENTS 5,650,704 A * 7/1997 Pratt .................... B25J 9/10
318/560
9,079,305 B2 * 7/2015 Williamson ........... B25J 9/1653
(Continued)

FOREIGN PATENT DOCUMENTS

JP 6-83427 A 3/1994
JP 6-339884 A 12/1994
(Continued)

OTHER PUBLICATIONS

Korean Office Action for Korean Application No. 10-2020-7010320, dated Oct. 12, 2020, with English translation.
(Continued)

*Primary Examiner* — Jaime Figueroa
(74) *Attorney, Agent, or Firm* — Birch, Stewart, Kolasch & Birch, LLP

(57) ABSTRACT

Disclosed is a calibration device including: a position information acquiring unit (101) for acquiring position information showing the position and the posture of control target equipment; a force information acquiring unit (102) for acquiring information about a force applied to the control target equipment from a detection result of a force sensor (5) disposed in the control target equipment; a first estimating unit (104) for estimating the force applied to the control target equipment from the acquired position information by using a physical model, to acquire estimated force information; and a second estimating unit (105) for estimating a linear or nonlinear model on the basis of the acquired position information, the acquired force information, and the acquired estimated force information.

8 Claims, 14 Drawing Sheets

(52) U.S. Cl.
CPC .......... *B25J 9/1694* (2013.01); *B25J 13/085* (2013.01); *B25J 19/02* (2013.01)

(58) Field of Classification Search
CPC ........ B25J 19/02; B25J 9/1602; B25J 9/1671; G05B 2219/39024; G05B 19/4155; G01D 5/00; G06N 3/02
USPC .................................................. 700/245–264
See application file for complete search history.

(56) References Cited

U.S. PATENT DOCUMENTS

| | | | | |
|---|---|---|---|---|
| 10,442,084 | B2* | 10/2019 | Sejimo | B25J 13/08 |
| 10,576,635 | B2* | 3/2020 | Ogawa | B25J 5/007 |
| 10,809,315 | B2* | 10/2020 | Zhou | G01L 25/00 |
| 2010/0094312 | A1* | 4/2010 | Ruiz Morales | A61B 34/35 606/130 |
| 2010/0113980 | A1* | 5/2010 | Herr | A61F 2/60 600/587 |
| 2014/0067124 | A1* | 3/2014 | Williamson | B25J 9/1653 700/258 |
| 2015/0127158 | A1 | 5/2015 | Shimodaira | |
| 2015/0382307 | A1 | 12/2015 | Harper et al. | |
| 2016/0231726 | A1 | 8/2016 | Shimodaira | |
| 2017/0120450 | A1 | 5/2017 | Toyoda et al. | |
| 2017/0334066 | A1* | 11/2017 | Levine | G06N 3/084 |
| 2018/0095144 | A1* | 4/2018 | Zhou | G01L 25/00 |
| 2018/0169854 | A1 | 6/2018 | Shiratsuchi | |
| 2018/0272535 | A1* | 9/2018 | Ogawa | B25J 9/1692 |
| 2020/0130192 | A1* | 4/2020 | Ogawa | B25J 13/085 |

FOREIGN PATENT DOCUMENTS

| | | | |
|---|---|---|---|
| JP | 7-210207 | A | 8/1995 |
| JP | 7-319558 | A | 12/1995 |
| JP | 2515594 | B2 | 7/1996 |
| JP | 2012-40634 | A | 3/2012 |
| JP | 2015-182164 | A | 10/2015 |
| JP | 2017-64879 | A | 4/2017 |
| JP | 2017-87313 | A | 5/2017 |
| JP | 2017-525259 | A | 8/2017 |
| WO | WO 2016/208467 | A1 | 12/2016 |

OTHER PUBLICATIONS

Lee et al. ,"Motion Teaching Method for Complex Robot Links Using Motor Current", International Journal of Control, Automation and Systems vol. 8 No. (5), Oct. 28, 2010, pp. 1072-1081.

Fukuda et al., "Theory and Applications of Neural Networks for Industrial Control Systems", IEEE, Transactions on Industrial Electoronics, vol. 39, pp. 472-489, Dec. 1992.

International Search Report dated Dec. 26, 2017 in PCT/JP2017/039765 filed Nov. 2, 2017.

Japanese Office Action dated May 29, 2018 in Japanese Patent Application No. 2018-518548.

Raibert et al., "Hybrid position/force control of manipulators", ASME, J. Dynamic Sys. Meas., Control vol. 102, pp. 126-133, Jun. 1981.

Taiwan Office Action dated May 14, 2018 in Taiwan Patent Application No. 107111840.

Office Action dated Nov. 8, 2021 in corresponding Indian Patent Application No. 202047015973.

* cited by examiner

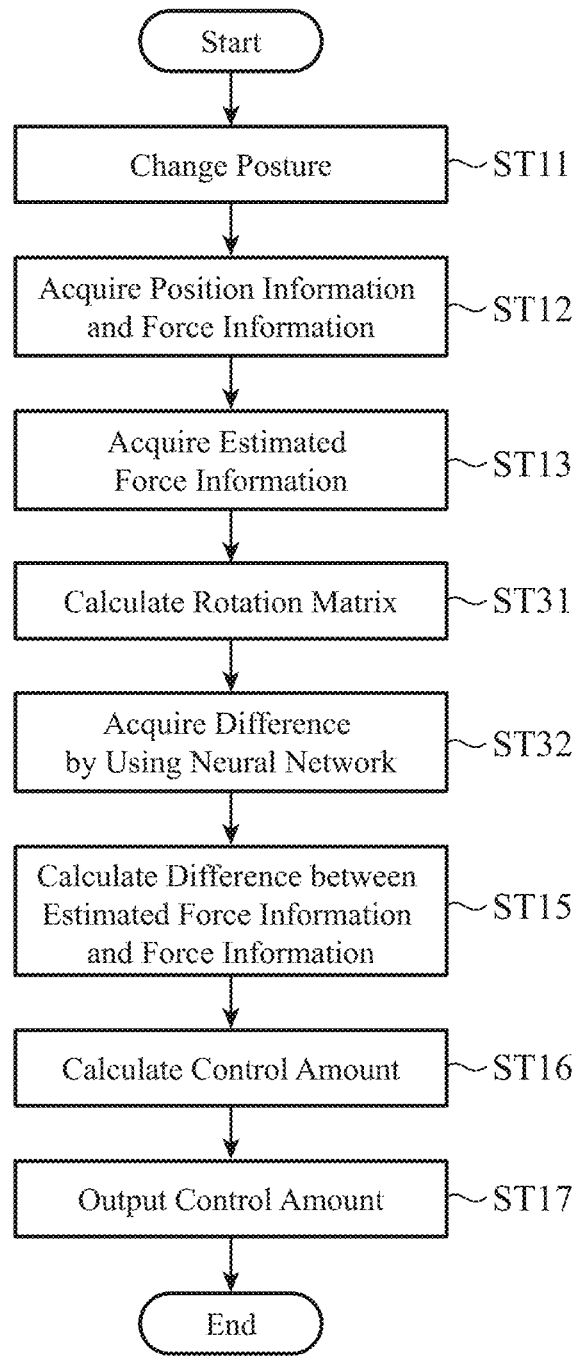

— First Line Segment
— Second Line Segment
— Third Line Segment

CALIBRATION DEVICE, CALIBRATION METHOD, AND CONTROL DEVICE

CROSS REFERENCE TO RELATED APPLICATION

This application is a Continuation of PCT International Application No. PCT/JP2017/039765, filed on Nov. 2, 2017, which is hereby expressly incorporated by reference into the present application.

TECHNICAL FIELD

The present disclosure relates to a technique of determining a contact force of a device that uses force control.

BACKGROUND ART

Conventionally, arm type robots that perform three-dimensional movements with end effectors being mounted to the leading ends of their arms via force sensors, and that perform various work on workpieces by using the end effectors have been used. In order for such a robot to perform various work, it is necessary to control the contact force acting between the end effector and the workpiece. However, the force detected by the force sensor includes, in addition to the contact force acting between the end effector and the workpiece, the gravity applied to the force sensor, the end effector, and the workpiece held by the end effector. In order to determine the contact force acting between the end effector and the workpiece, it is necessary to remove the gravity components applied to the force sensor, the end effector, the workpiece held by the end effector, and so on from the result detected by the force sensor.

For example, Patent Literature 1 discloses a calibration device that causes a robot arm to operate with multiple postures, acquires a measured value of a force sensor and posture data about the force sensor when acquiring the measured value, calculates multiple parameters including the weight of an end effector, a gravity direction vector, and a centroid position vector of the end effector by using an arithmetic device, and simultaneously calibrates the calculated parameters.

CITATION LIST

Patent Literature

Patent Literature 1: JP 2012-040634 A

SUMMARY OF INVENTION

Technical Problem

In the calibration device described in above-mentioned Patent Literature 1, the gravity components applied to the force sensor, the end effector, the workpiece held by the end effector, and so on are modelized using a mass point model, and are estimated. However, the end effector and so on have a mass distribution, and errors occur when the gravity components are estimated using a mass point model. Further, it is difficult to estimate a gravity component correctly for a member whose gravity component changes depending on the posture of the robot arm, such as a cable wound around the robot arm. As mentioned above, a problem with the technique described in Patent Literature 1 is that it is difficult to estimate a gravity component correctly by using a mass point model.

The present disclosure is made in order to solve the above-mentioned problem, and it is therefore an object of the present disclosure to provide a technique of suppressing estimation errors of gravity components and providing a correct calibration result.

Solution to Problem

A calibration device according to the present disclosure includes: a position information acquiring unit for acquiring position information showing the position and the posture of control target equipment which constructs a device performing a force control and has at least either of the changing position and the changing posture; a force information acquiring unit for acquiring information about a force applied to the control target equipment from a detection result of a force sensor disposed in the control target equipment; a first estimating unit for estimating the force applied to the control target equipment from the position information acquired by the position information acquiring unit by using a physical model, to acquire estimated force information; and a second estimating unit for estimating a difference between estimated force information and force information using a linear or nonlinear model on the basis of the position information acquired by the position information acquiring unit, the force information acquired by the force information acquiring unit, and the estimated force information acquired by the first estimating unit when the control target equipment is not contact with other objects, wherein the second estimating unit sets the position information acquired by the position information acquiring unit as an input to a neural network and sets a difference between the estimated force information acquired by the first estimating unit and the force information acquired by the force information acquiring unit as a teaching signal for the neural network, and performs learning of the neural network.

Advantageous Effects of Invention

According to the present disclosure, estimation errors of gravity components can be suppressed. As a result, a correct calibration result can be acquired, and the calibration technique can be applied to a device that performs a precise operation.

BRIEF DESCRIPTION OF DRAWINGS

FIG. 15 is a flowchart showing the operation of the calibration device according to Embodiment 2 when a robot is normally operating.

DESCRIPTION OF EMBODIMENTS

Hereinafter, in order to explain the present disclosure in greater detail, embodiments of the present disclosure will be described with reference to the accompanying drawings.

In each of the embodiments mentioned later, an explanation will be made concretely by taking, as an example, a robot system that performs calibration processing, as a calibration device, in a system that employs a robot. However, the calibration device according to the present disclosure is not limited to one in a case in which a robot is used, and can perform calibration with the same configuration for any device that performs force control. More specifically, the application range of the calibration device according to the present disclosure is not limited to robot systems. As devices that perform force control, for example, automatic machining devices and automatic assembling devices are named.

Embodiment 1

Figure 1:
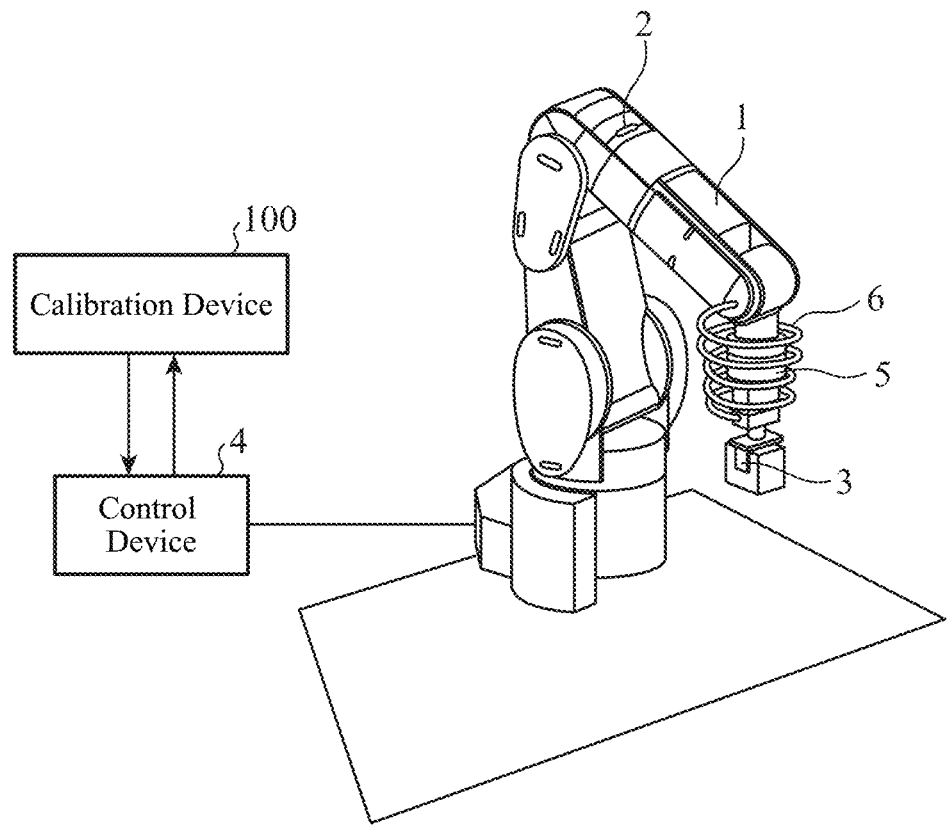
FIG. 1 is a diagram showing the configuration of a robot system to which a calibration device according to Embodiment 1 is applied.

FIG. 1 is a diagram showing the configuration of a robot system to which a calibration device 100 according to Embodiment 1 is applied.

The robot system has, as basic components, a robot (control target equipment) 2 including a robot arm (control target equipment) 1, an end effector (control target equipment) 3 mounted to a leading end of the robot arm 1, and a control device 4 that controls the robot 2 and the end effector 3. Further, in the robot system that performs force control, a force sensor 5 is disposed, as a sensor that acquires force information, between the robot arm 1 and the end effector 3.

The robot 2 moves either the position of the leading end of the robot arm 1 or the position of a leading end of the end effector 3 mounted to the leading end of the robot arm 1 on an arbitrary coordinate system, to perform position control. The control device 4 outputs control information for performing the position control on the leading end position of the end effector 3 to the robot 2.

Further, the use of the force sensor 5 makes it possible to perform not only the position control of the leading end position of the end effector 3, but also the force control of the end effector 3. The force control of the end effector 3 is one for controlling the action state of a force between the end effector 3 and a surrounding object or between the end effector 3 and a surrounding environment, i.e., a contact force. The performance of the force control of the end effector 3 makes it possible to perform work that is to be performed while the contact state between the end effector 3 and a workpiece is taken into consideration, such as polishing work, deburring work, or assembly of a connector or the like by using the robot 2.

In the robot system, a cable 6 is mounted to the leading end of the robot arm 1 depending on its purposes, as shown in FIG. 1. The cable 6 includes, for example, a cable extending from the force sensor 5, a cable for power supply, and a cable for supplying a control signal from the control device 4. In many cases, the cable 6 is wound while being slack, with its tension being relieved for the purpose of preventing the cable from being entangled because of movements of the robot 2, and its gravity component varies depending on the posture of the robot arm 1. The gravity component of the cable 6 is added to the force information of the force sensor 5, and causes errors. These errors become a problem when the robot arm 1 performs high-accuracy work.

Accordingly, the calibration device 100 performs calibration to optimize the parameters of a neural network by using the difference between the force applied to the robot 2, the force being estimated using a mass point model, and the force information of the force sensor 5.

The model for estimating the force applied to the robot 2 may be a physical model other than the mass point model. As a physical model other than the mass point model, for example, a rigid body model can be used.

First, the coordinate system on which the calibration device 100 performs the calibration processing will be explained.

Figure 2:
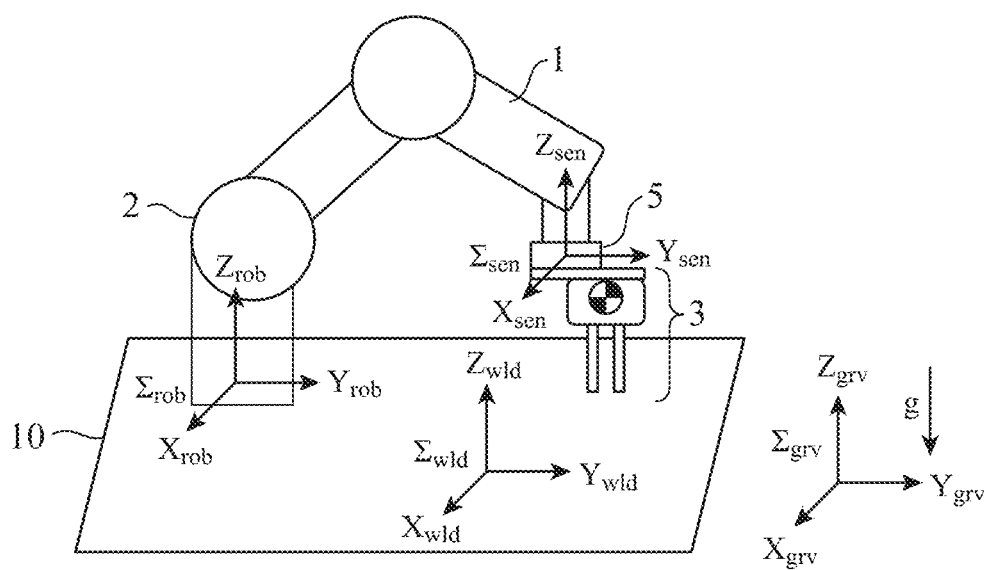
FIG. 2 is a diagram showing a positional relationship among a robot coordinate system, a world coordinate system, a gravity coordinate system, and a sensor coordinate system, in the robot system according to Embodiment 1.

FIG. 2 is a diagram showing a positional relationship among a robot coordinate system, a world coordinate system, a gravity coordinate system, and a sensor coordinate system in the robot system according to Embodiment 1.

In FIG. 2, the robot coordinate system defined as a reference coordinate system of the robot 2 fixed in the robot system is expressed as $\Sigma_{rob}$, the world coordinate system defined as a coordinate system common to pieces of equipment in the robot system is expressed as $\Sigma_{wld}$, the gravity coordinate system in which the direction of gravitational acceleration is a negative Z direction is expressed as $\Sigma_{grv}$, and the sensor coordinate system defined as a reference coordinate system of the force sensor 5 is expressed as $\Sigma_{sen}$.

The calibration device 100 may perform the processing by using any one of the coordinate systems shown in FIG. 2. In the following explanation, a case in which the calibration device 100 performs the processing by using the sensor coordinate system will be explained as an example.

Figure 3:
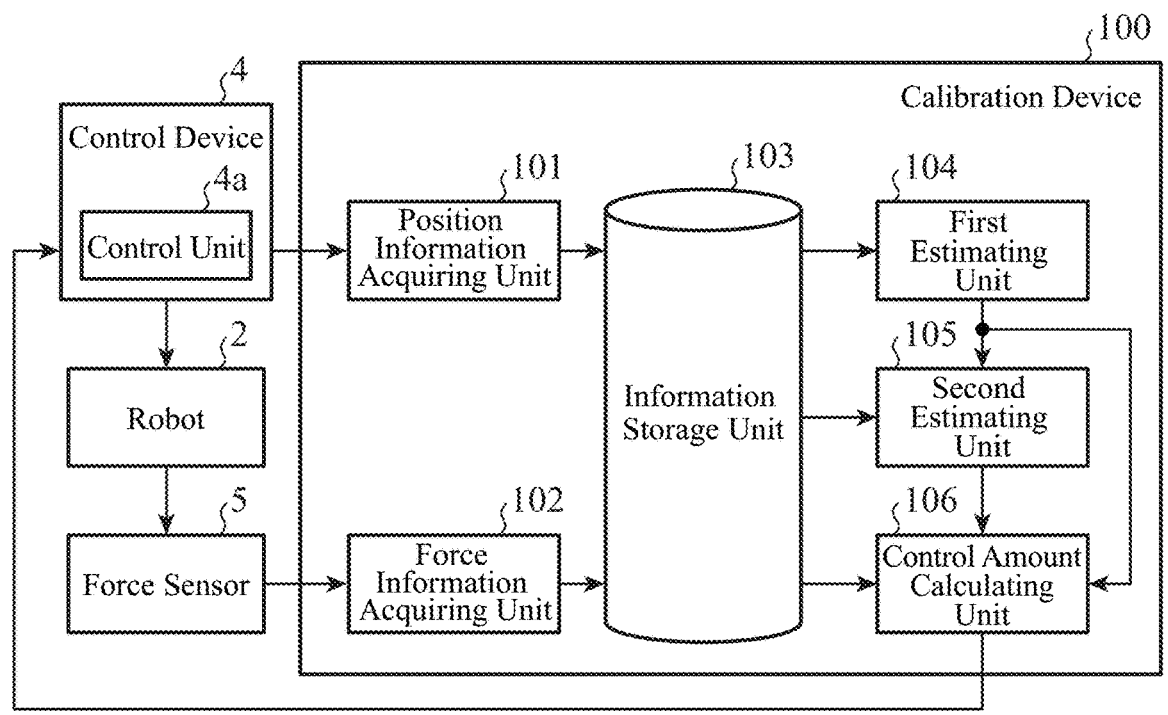
FIG. 3 is a block diagram showing the configuration of the calibration device according to Embodiment 1.

FIG. 3 is a block diagram showing the configuration of the calibration device 100 according to Embodiment 1.

The calibration device 100 includes a position information acquiring unit 101, a force information acquiring unit 102, an information storage unit 103, a first estimating unit 104, a second estimating unit 105, and a control amount calculating unit 106. Further, the control device 4 and the force sensor 5 are connected to the calibration device 100, as shown in FIG. 3. Further, the robot 2 is connected to the control device 4 and the force sensor 5.

When the calibration device 100 is used, the position information acquiring unit 101, the force information acquiring unit 102, the information storage unit 103, the first estimating unit 104, and the second estimating unit 105 perform processing to optimize the parameters in an intermediate layer of the neural network first (referred to as the calibration processing hereinafter).

The position information acquiring unit 101 acquires the position information about the robot 2 from the control device 4, and causes the information storage unit 103 to store the position information. The position information acquiring unit 101 acquires, as the position information about the robot 2, information showing the position and the posture of the end effector 3. The position information shows, for example, [A, B, C] that is three rotational degrees of freedom expressed by Euler representation and defined with respect to an X axis, a Y axis, and a Z axis. The force information acquiring unit 102 acquires information showing the force applied to the robot 2 (referred to as force information hereinafter) from a result of the detection by the force sensor 5, and causes the information storage unit 103 to store the force information.

When performing the calibration processing, the control device 4 sets up an arbitrary axis of rotation passing through the point of origin of one of the robot coordinate system, the world coordinate system, the gravity coordinate system, and the sensor coordinate system, and performs control to change the posture of the robot 2 around the set-up axis of rotation. An amount of rotation angle at the time of rotating the robot 2 around the set-up axis of rotation is set arbitrarily. The control device 4 determines the posture of the robot 2 that is intended for acquiring the position information and the force information, on the basis of the set-up axis of rotation and the set amount of rotation angle, and outputs, as a posture command value, the posture to the robot 2. In accordance with the posture command value inputted from the control device 4, the robot 2 rotates around the set-up axis of rotation by the set amount of rotation angle, to change its posture. The position information acquiring unit 101 and the force information acquiring unit 102 discretely acquire the position information and the force information about the robot 2 that is changing its posture, and store the position information and the force information in the information storage unit 103. The timing at which the position information acquiring unit 101 and the force information acquiring unit 102 acquire the position information and the force information can be set as appropriate. The information storage unit 103 stores the position information inputted from the position information acquiring unit 101 and the force information inputted from the force information acquiring unit 102.

The first estimating unit 104 estimates the force applied to the robot 2 from the position information stored in the information storage unit 103 by using the mass point model, to acquire estimated force information. The parameters of the mass point model are the weight of the end effector 3 at one mass point, the centroid position of the end effector 3, and a bias. The first estimating unit 104 outputs the acquired estimated force information to the second estimating unit 105.

The second estimating unit 105 receives, as an input, the position information and the force information that are stored in the information storage unit 103, and the estimated force information acquired by the first estimating unit 104, and estimates a difference between the estimated force information and the force information using a linear or nonlinear model. Concretely, the second estimating unit 105 uses multiple sets each including the position information and the difference between the estimated force information and the force information, to perform learning on the basis of a typical learning rule for the neural network. Although the neural network has various kinds of forms, such as a convolutional neural network (CNN) and a recurrent neural network (RNN), its form can be arbitrarily applied.

Figure 4:
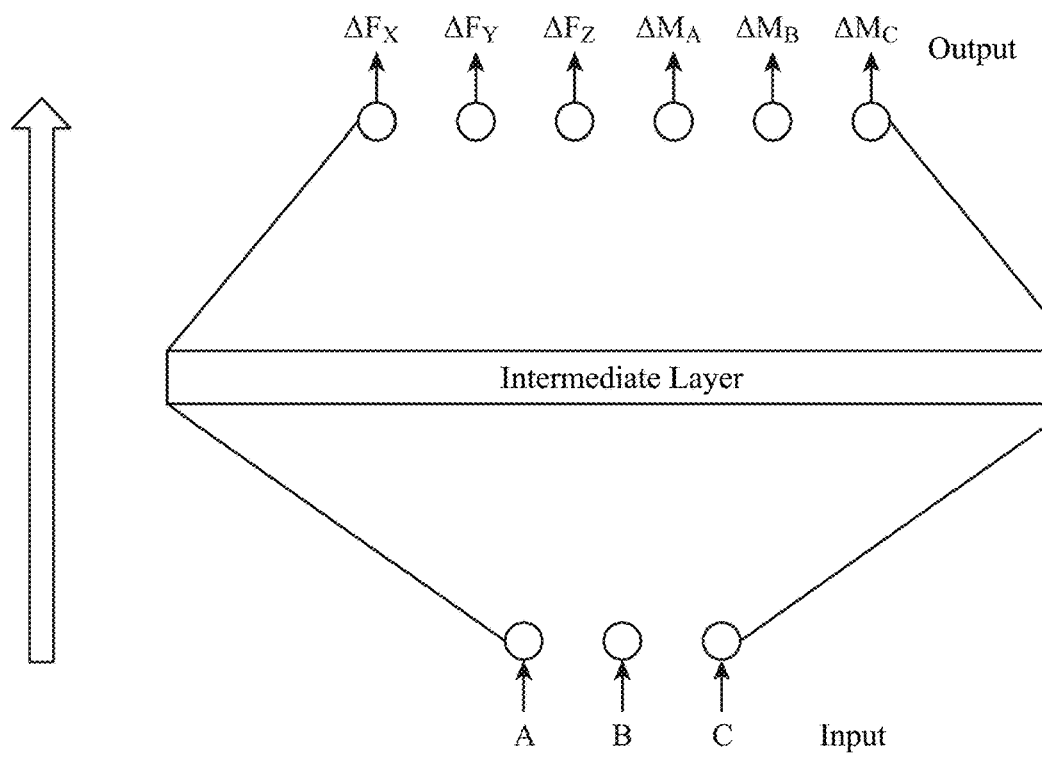
FIG. 4 is a diagram showing an example of a neural network in a second estimating unit of the calibration device according to Embodiment 1, and a learning rule for the neural network.

FIG. 4 is a diagram showing an example of the neural network in the second estimating unit 105 of the calibration device 100 according to Embodiment 1, and the learning rule for the neural network.

The position information [A, B, C] stored in the information storage unit 103 is inputted to an input layer, and the difference ($\Delta F_X$, $\Delta F_Y$, $\Delta F_Z$, $\Delta M_A$, $\Delta M_B$, $\Delta M_C$) between the estimated force information and the force information is outputted from an output layer.

In the course of the learning of the neural network, the second estimating unit 105 optimizes the parameters in the intermediate layer in order to approximate the output value of the output layer that is acquired, via the intermediate layer, from the inputted position information to a teaching signal, i.e., the difference between the estimated force information and the force information.

In FIG. 4, the explanation is made by taking, as an example, the case in which the force sensor 5 is a 6-axis sensor, and the direction of movement of the robot arm 1, and the orientation and rotation of the robot arm can be detected. On the other hand, the force sensor 5 may be a 3-axis sensor, and the structure of the sensor can be set up as appropriate. The output of the neural network can be set as appropriate on the basis of the structure of the force sensor 5.

Next, when work is actually performed using the robot (referred to as "at the time of a normal operation" hereinafter), in the calibration device 100, the position information acquiring unit 101, the force information acquiring unit 102, the information storage unit 103, the first estimating unit 104, the second estimating unit 105, and the control amount calculating unit 106 perform processes of calculating a command value for the control device 4.

The position information acquiring unit 101 acquires the position information and the force information about the robot 2 at the time of a normal operation, and causes the information storage unit 103 to store the position information and the force information. The first estimating unit 104 estimates the force applied to the robot 2 from the position information stored in the information storage unit 103, to acquire estimated force information. The first estimating unit 104 outputs the acquired estimated force information to the control amount calculating unit 106.

The second estimating unit 105 inputs the position information stored in the information storage unit 103 to the neural network, and estimates the difference between the estimated force information and the force information. The second estimating unit 105 outputs the estimated difference to the control amount calculating unit 106. The control amount calculating unit 106 subtracts the difference inputted from the second estimating unit 105 from the difference between the estimated force information inputted from the first estimating unit 104 and the force information stored in the information storage unit 103, to calculate a control amount for the control device 4. The control amount calculating unit 106 outputs the calculated control amount to the control device 4. A control unit 4a of the control device 4 controls the robot 2 by using the control amount inputted from the control amount calculating unit 106. Although in above-mentioned FIG. 3 the structure in which the calibration device 100 includes the control amount calculating unit 106 is shown, there may be provided a structure in which the control device 4 includes the control amount calculating unit 106.

Next, examples of the hardware configuration of the calibration device 100 will be explained.

Figure 5A:
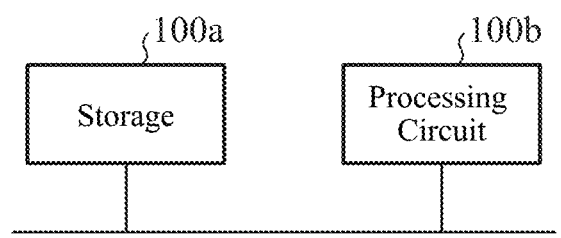
FIGS. 5A and 5B are diagrams showing examples of the hardware configuration of the calibration device.
Figure 5B:
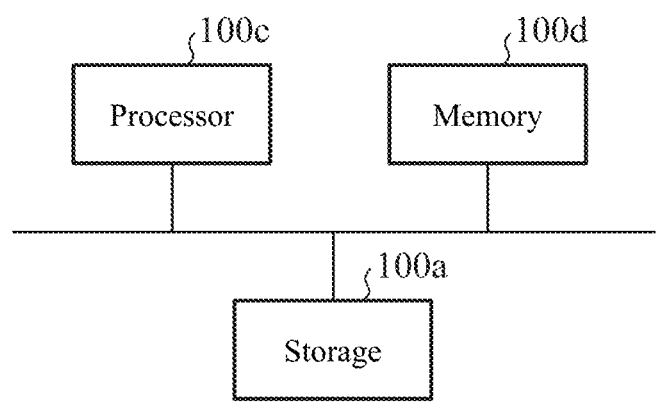

FIGS. 5A and 5B are diagrams showing examples of the hardware configuration of the calibration device 100.

The information storage unit 103 in the calibration device 100 is implemented by a storage 100a. Each of the functions of the position information acquiring unit 101, the force information acquiring unit 102, the first estimating unit 104, the second estimating unit 105, and the control amount calculating unit 106 in the calibration device 100 is implemented by a processing circuit. More specifically, the calibration device 100 includes a processing circuit for implementing each of the above-mentioned functions. The processing circuit may be a processing circuit 100b that is hardware for exclusive use as shown in FIG. 5A, or may be a processor 100c that executes a program stored in a memory 100d as shown in FIG. 5B.

In the case in which the position information acquiring unit 101, the force information acquiring unit 102, the first estimating unit 104, the second estimating unit 105, and the control amount calculating unit 106 are hardware for exclusive use, as shown in FIG. 5A, the processing circuit 100b is, for example, a single circuit, a composite circuit, a programmable processor, a parallel programmable processor, an application specific integrated circuit (ASIC), a field-programmable gate array (FPGA), or a combination of these circuits. Each of the functions of the position information acquiring unit 101, the force information acquiring unit 102, the first estimating unit 104, the second estimating unit 105, and the control amount calculating unit 106 may be implemented by a processing circuit, or the function of the units may be implemented collectively by a single processing circuit.

In the case in which the position information acquiring unit 101, the force information acquiring unit 102, the first estimating unit 104, the second estimating unit 105, and the control amount calculating unit 106 are the processor 100c, as shown in FIG. 5B, the function of each of the units is implemented by software, firmware, or a combination of software and firmware. The software or the firmware is described as a program and the program is stored in the memory 100d. The processor 100c implements each of the functions of the position information acquiring unit 101, the force information acquiring unit 102, the first estimating unit 104, the second estimating unit 105, and the control amount calculating unit 106 by reading and executing a program stored in the memory 100d. More specifically, the position information acquiring unit 101, the force information acquiring unit 102, the first estimating unit 104, the second estimating unit 105, and the control amount calculating unit 106 include the memory 100d for storing programs in which steps shown in FIGS. 6 and 8, which will be mentioned later, are performed as a result when the programs are executed by the processor 100c. Further, it can be said that these programs cause a computer to perform procedures or methods that the position information acquiring unit 101, the force information acquiring unit 102, the first estimating unit 104, the second estimating unit 105, and the control amount calculating unit 106 use.

Here, the processor 100c is, for example, a central processing unit (CPU), a processing device, an arithmetic device, a processor, a microprocessor, a microcomputer, a digital signal processor (DSP), or the like.

The memory 100d is, for example, a non-volatile or volatile semiconductor memory such as a random access memory (RAM), a read only memory (ROM), a flash memory, an erasable programmable ROM (EPROM), or an electrically EPROM (EEPROM); a magnetic disc such as a hard disc or a flexible disc, or an optical disc such as a mini disc, a compact disc (CD), or a digital versatile disc (DVD).

Part of each of the functions of the position information acquiring unit 101, the force information acquiring unit 102, the first estimating unit 104, the second estimating unit 105, and the control amount calculating unit 106 may be implemented by hardware for exclusive use, and part of each of the functions may be implemented by software or firmware. As mentioned above, the processing circuit in the calibration device 100 can implement each of the above-mentioned functions by using hardware, software, firmware, or a combination of hardware, software, and firmware.

Next, the operation of the calibration device 100 will be explained.

The operation of the calibration device 100 will be explained while being divided into an operation at the time of the calibration processing and an operation at the time of a normal operation. First, the operation at the time of the calibration processing of the calibration device 100 will be explained by referring to FIGS. 6 and 7.

Figure 6:
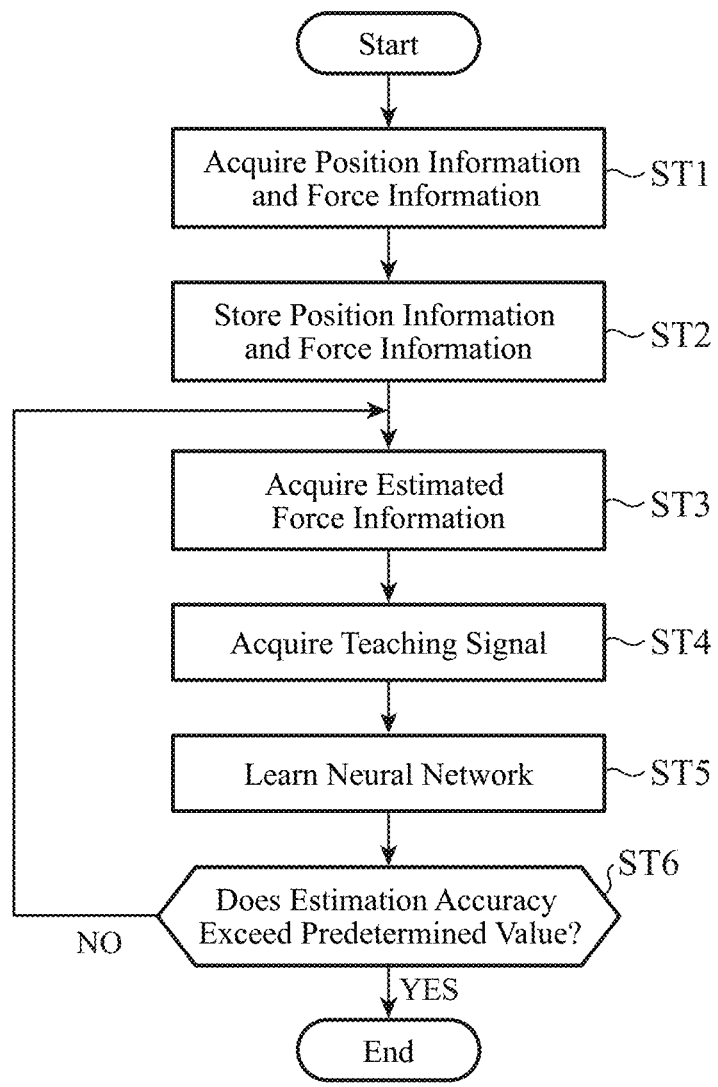
FIG. 6 is a flowchart showing the operation of the calibration device according to Embodiment 1 at a time of calibration processing.

FIG. 6 is a flowchart showing the operation at the time of the calibration processing of the calibration device 100 according to Embodiment 1.

Figure 7:
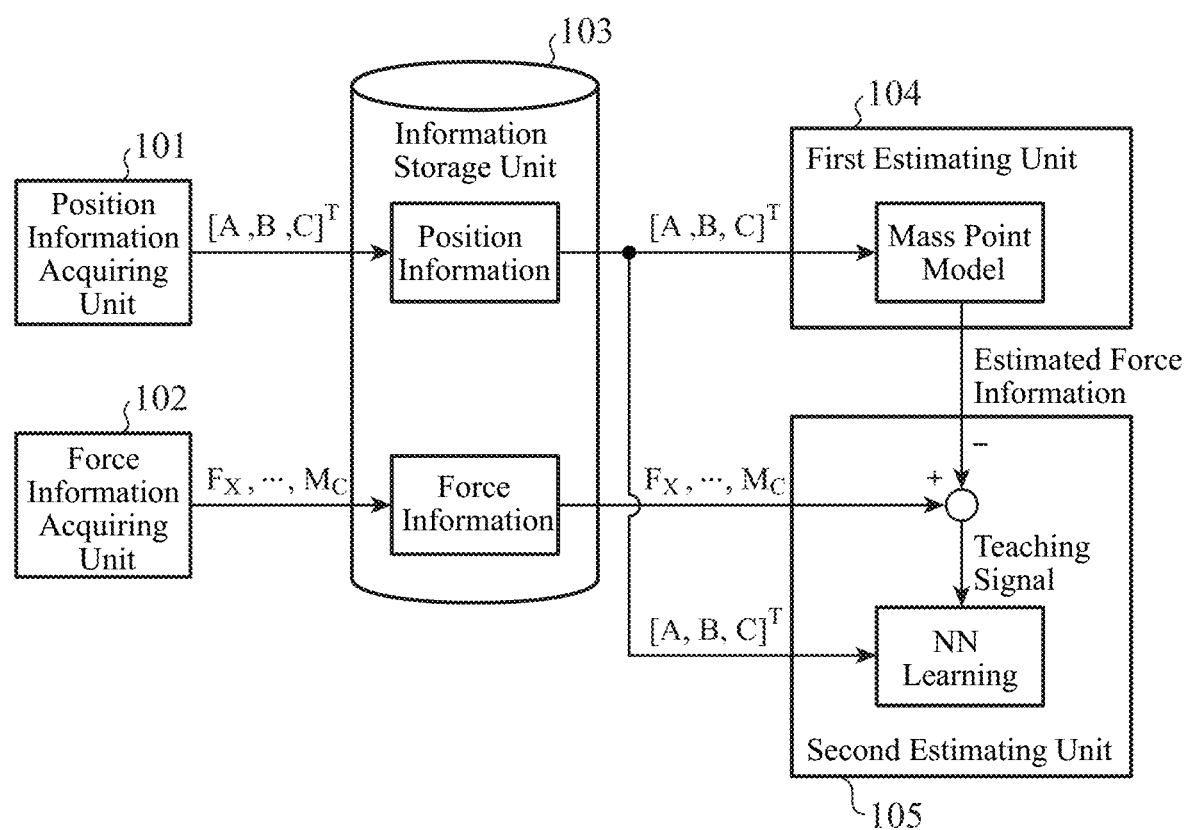
FIG. 7 is a diagram showing a data flow of the calibration device according to Embodiment 1 at the time of the calibration processing.

FIG. 7 is a diagram showing a data flow of the calibration device 100 according to Embodiment 1 at the time of the calibration processing.

The position information acquiring unit 101 and the force information acquiring unit 102 acquire the position information $[A, B, C]^T$ and the force information $F_X$, $F_Y$, $F_Z$, $M_A$, $M_B$, $M_C$ (step ST1), and cause the information storage unit 103 to store the acquired position information and the acquired force information (step ST2). The processes of steps ST1 and ST2 are repeatedly performed in accordance with a change of the posture of the robot 2. The first estimating unit 104 estimates the force applied to the robot 2 from the position information $[A, B, C]^T$ stored in the information storage unit 103, to acquire estimated force information (step ST3). The first estimating unit 104 outputs the acquired estimated force information to the second estimating unit 105.

The second estimating unit 105 calculates the difference between the estimated force information acquired in step ST3 and the force information $F_X$, $F_Y$, $F_Z$, $M_A$, $M_B$, $M_C$ stored in the information storage unit 103, to acquire a teaching signal (step ST4). The second estimating unit 105 inputs the position information $[A, B, C]^T$ stored in the information storage unit 103 to the neural network, and performs the learning to approximate the output of the neural network to the teaching signal acquired in step ST4 (step ST5). Concretely, the second estimating unit 105 optimizes the parameters in the intermediate layer of the neural network in order to approximate the output of the neural network to the teaching signal.

The second estimating unit 105 determines whether or not the estimation accuracy exceeds a predetermined amount (step ST6). When the estimation accuracy does not exceed the predetermined amount (NO in step ST6), the flowchart returns to the process of step ST3 and the above-mentioned processes are repeatedly performed. In contrast, when the estimation accuracy exceeds the predetermined amount (YES in step ST6), the calibration device 100 ends the calibration processing.

Next, the operation of the calibration device 100 when the robot 2 is normally operating will be explained by referring to FIGS. 8 and 9.

Figure 8:
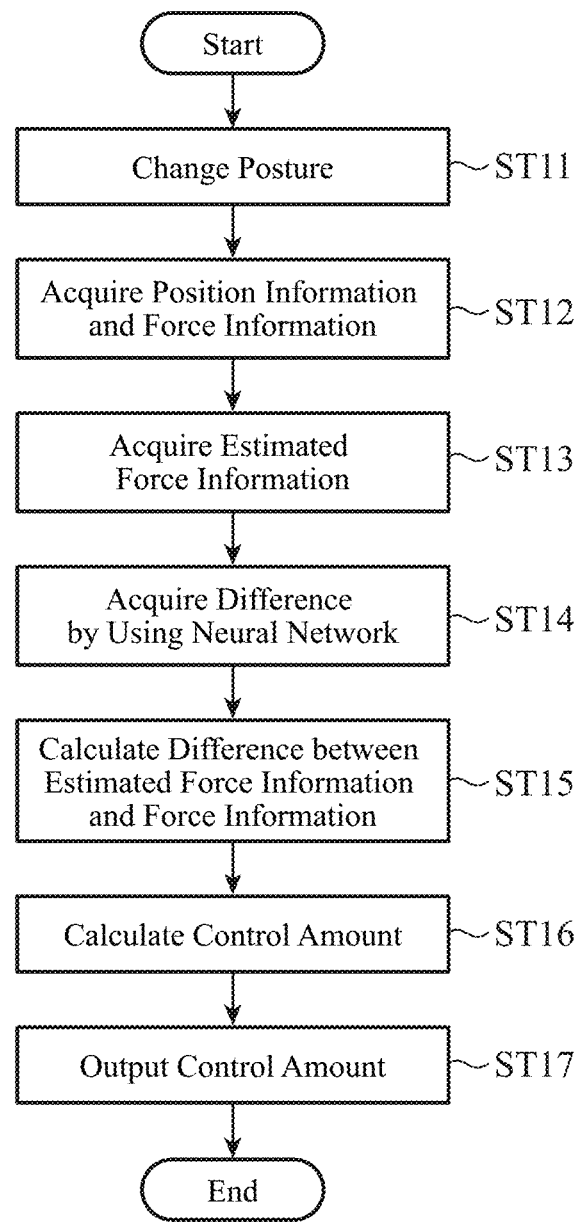
FIG. 8 is a flowchart showing the operation of the calibration device according to Embodiment 1 when a robot is normally operating.

FIG. 8 is a flowchart showing the operation of the calibration device 100 according to Embodiment 1 when the robot 2 is normally operating.

Figure 9:
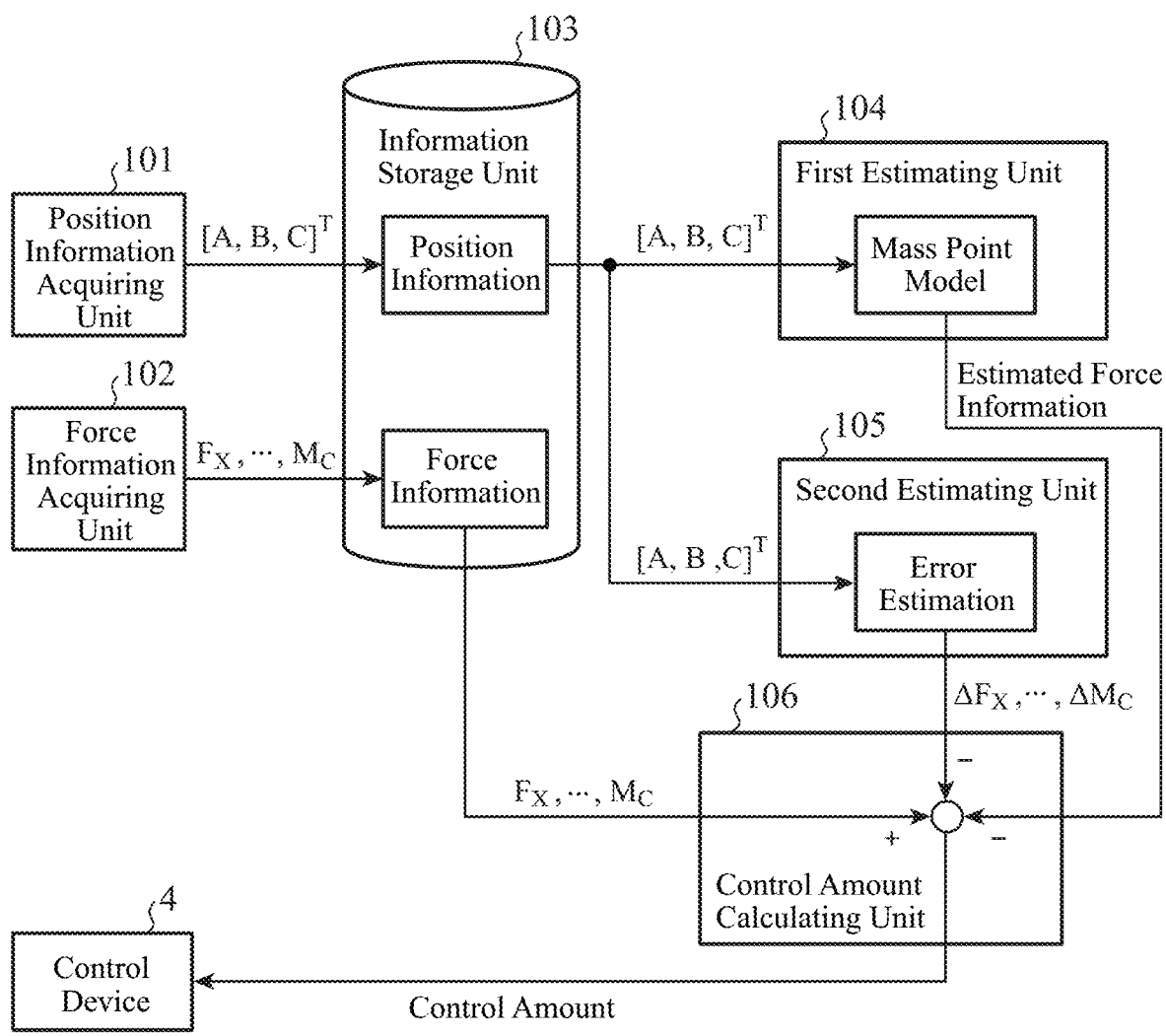
FIG. 9 is a diagram showing a data flow of the calibration device according to Embodiment 1 when the robot is normally operating.

FIG. 9 is a diagram showing a data flow of the calibration device 100 according to Embodiment 1 when the robot 2 is normally operating.

When the robot 2 operates and its posture is changed (step ST11), the position information acquiring unit 101 and the force information acquiring unit 102 acquire the position information $[A, B, C]^T$ and the force information $F_X$, $F_Y$, $F_Z$, $M_A$, $M_B$, $M_C$ (step ST12). The position information acquiring unit 101 and the force information acquiring unit 102 cause the information storage unit 103 to store the acquired position information $[A, B, C]^T$ and the acquired force information $F_X$, $F_Y$, $F_Z$, $M_A$, $M_B$, $M_C$. The first estimating unit 104 estimates the force applied to the robot 2 from the position information $[A, B, C]^T$ stored in the information storage unit 103, to acquire estimated force information (step ST13). The first estimating unit 104 outputs the acquired estimated force information to the control amount calculating unit 106.

The second estimating unit 105 inputs the position information $[A, B, C]^T$ stored in the information storage unit 103 to the input layer of the learned neural network, and acquires, as an output, the difference $\Delta F_X$, $\Delta F_Y$, $\Delta F_Z$, $\Delta M_A$, $\Delta M_B$, $\Delta M_C$ (step ST14). The second estimating unit 105 outputs the acquired difference $\Delta F_X$, $\Delta F_Y$, $\Delta F_Z$, $\Delta M_A$, $\Delta M_B$, $\Delta M_C$ to the control amount calculating unit 106. The control amount calculating unit 106 calculates the difference between the estimated force information acquired in step ST13 and the force information $F_X$, $F_Y$, $F_Z$, $M_A$, $M_B$, $M_C$ stored in the information storage unit 103 (step ST15). The control amount calculating unit 106 subtracts the difference $\Delta F_X$, $\Delta F_Y$, $\Delta F_Z$, $\Delta M_A$, $\Delta M_B$, $\Delta M_C$ acquired in step ST14 from the difference calculated in step ST15, to calculate a control amount (step ST16). The control amount calculating unit 106 outputs the control amount calculated in step ST16 to the control device 4 (step ST17), and ends the processing.

Calibration results provided by the calibration device 100 will be explained by referring to FIG. 10.

FIG. 10 is a diagram showing calibration results provided by the calibration device 100 according to Embodiment 1.

In FIGS. 10A to 10F, a first line segment shows a result of performing the calibration by estimating the force information by using the mass point model, and a second line segment shows a result of performing the calibration by both estimating the force information by using the mass point model, and using the neural network.

Figures 10A, 10B, 10C, 10D, 10E, 10F:
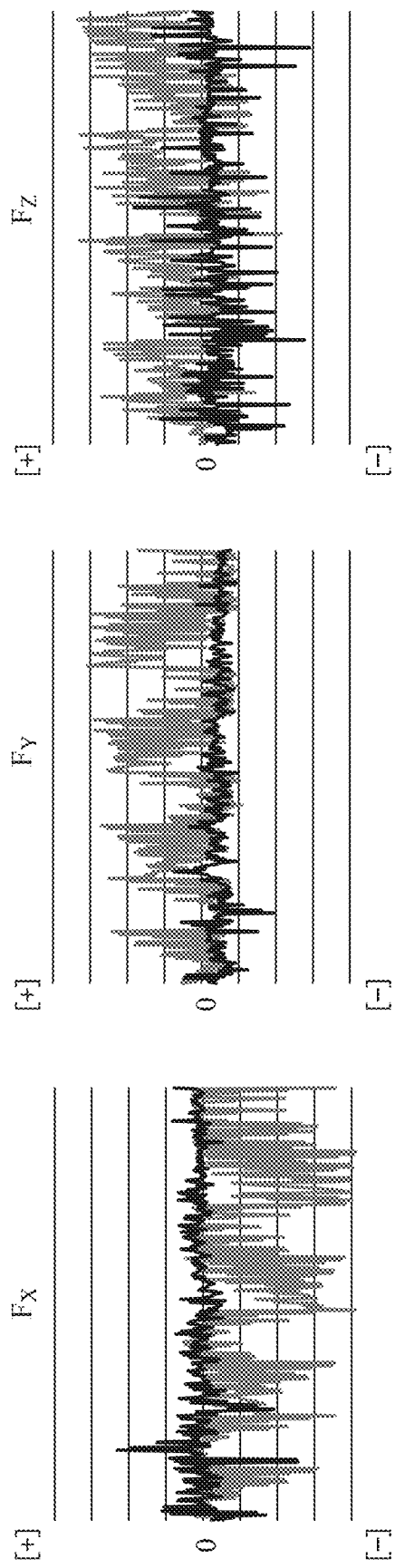
FIGS. 10A to 10F are diagrams showing calibration results provided by the calibration device according to Embodiment 1.

Further, FIG. 10A shows the force information $F_X$ in a direction of the X axis, FIG. 10B shows the force information $F_Y$ in a direction of the Y axis, and FIG. 10C shows the force information $F_Z$ in a direction of the Z axis. In addition, FIG. 10D shows a moment $M_X$ around the X axis, FIG. 10E shows a moment $M_Y$ around the Y axis, and FIG. 10F shows a moment $M_Z$ around the Z axis.

FIG. 10 shows the difference that is the output acquired by inputting the position information to the learned neural network when the robot 2 is moved. Further, FIG. 10 shows the difference when the robot 2 moves in a state in which the end effector 3 of the robot 2 is not in contact with any workpiece and so on. Therefore, it can be determined from FIG. 10 that the closer the value of the difference is to "0", the better calibration result is acquired. In all of FIGS. 10A to 10F, the result of performing the calibration by both estimating the force information by using the mass point model, and using the neural network, the result being shown by the second line segment, is better than the result of performing the calibration by estimating the force information by using the mass point model, the result being shown by the first line segment.

As mentioned above, according to this Embodiment 1, because the position information acquiring unit 101 that acquires position information showing the position and the posture of the control target equipment, the force information acquiring unit 102 that acquires information about a force applied to the control target equipment from a detection result of the force sensor 5 disposed in the control target equipment, the first estimating unit 104 that estimates the force applied to the control target equipment from the position information acquired by the position information acquiring unit 101 by using a physical model, to acquire estimated force information, and the second estimating unit 105 that estimates a difference between the estimated force information and the force information using a linear or nonlinear model on the basis of the position information acquired by the position information acquiring unit 101, the force information acquired by the force information acquiring unit 102, and the estimated force information acquired by the first estimating unit 104 are included, estimation errors of gravity components can be suppressed. As a result, a correct calibration result can be acquired, and the above-mentioned calibration technique can be applied to a device that performs a precise operation.

Further, according to this Embodiment 1, because the second estimating unit 105 is configured so as to set the position information acquired by the position information acquiring unit 101 as an input to the neural network and set the difference between the estimated force information acquired by the first estimating unit 104 and the force information acquired by the force information acquiring unit 102 as a teaching signal for the neural network, and performs learning of the neural network, also in a case in which it is difficult to provide a nonlinear physical model, in a case of using a cable which is difficult to physically modelize using a mass point model or the like, or in a like case, the influence on the force information can be eliminated.

Embodiment 2

Figure 11:
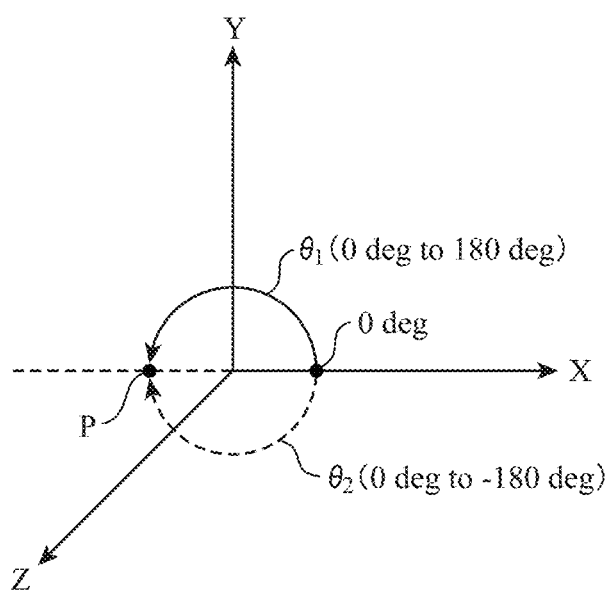
FIG. 11 is a diagram showing domains of position information expressed by Euler representation.

In above-mentioned Embodiment 1, it is shown that the position information is [A, B, C] that is the three rotational degrees of freedom expressed by Euler representation and defined with respect to the X axis, the Y axis, and the Z axis. There is a case in which position information expressed by Euler representation is represented by position information expressed by a domain $\theta_1$ ranging from 0 degrees to 180 degrees and position information expressed by a domain $\theta_2$ ranging from 0 degrees to −180 degree when showing, for example, a position making one rotation on the X axis as shown in FIG. 11. In this case, at the boundary point P between the domain $\theta_1$ and the domain $\theta_2$, i.e., at the point of 180 degrees and −180 degrees, a numerical inversion occurs and this results in a numerical discontinuity at which the numerical value is discontinuous. In this Embodiment 2, a configuration for, in domains of position information expressed by Euler representation, converting a numerical value showing the position information into a representation that does not include discontinuities is shown.

Figure 12:
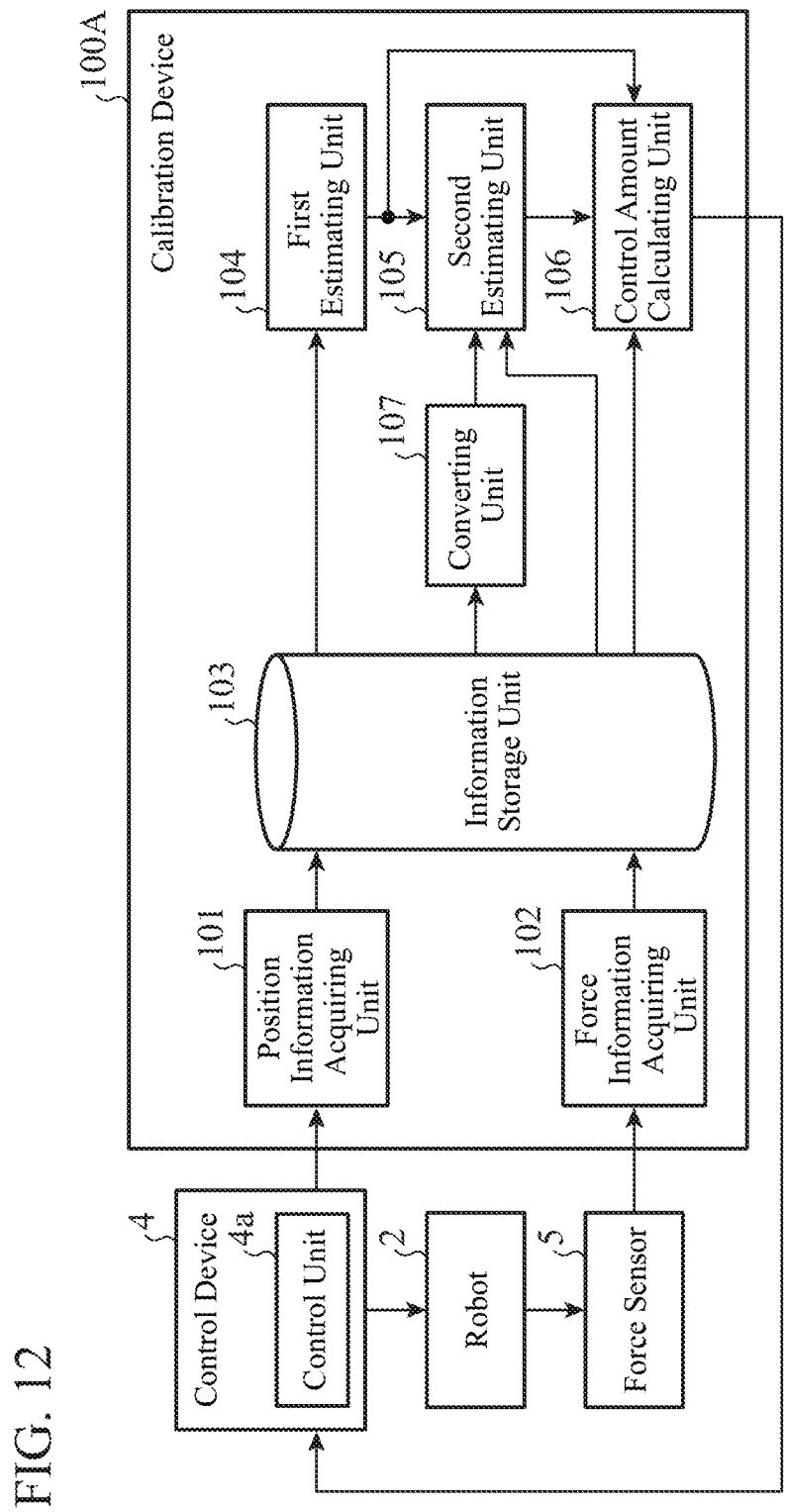
FIG. 12 is a block diagram showing the configuration of a calibration device according to Embodiment 2.

FIG. 12 is a block diagram showing the configuration of a calibration device 100A according to Embodiment 2.

The calibration device 100A of Embodiment 2 is configured so as to include a converting unit 107 in addition to the components of the calibration device 100 shown in FIG. 3. Hereinafter, the same components as those of the calibration device 100 according to Embodiment 1 or like components are denoted by the same reference signs as those used in Embodiment 1, and an explanation of the components will be omitted or simplified.

The converting unit 107 performs a rotation matrix calculation on the position information [A, B, C] stored in an information storage unit 103, to convert the position information into a vector representation. The rotation matrix calculation performed by the converting unit 107 is expressed by the following equation (1).

$$\hat{R} = \begin{bmatrix} r_{11} & r_{12} & r_{13} \\ r_{21} & r_{22} & r_{23} \\ r_{31} & r_{32} & r_{33} \end{bmatrix} = \hat{R}(A)\hat{R}(B)\hat{R}(C) \quad (1)$$

$\hat{R}$ (referred to as R-hat hereinafter) in the equation (1) denotes a rotation matrix.

In the equation (1), an angle of rotation around an X axis is denoted by A, an angle of rotation around a Y axis is denoted by B, an angle of rotation around a Z axis is denoted by C, a rotation matrix for performing coordinate conversion using rotation around the X axis is denoted by R-hat(A), a rotation matrix for performing coordinate conversion using rotation around the Y axis is denoted by R-hat(B), and a rotation matrix for performing coordinate conversion using rotation around the Z axis is denoted by R-hat(C).

Further, the rotation matrices R-hat(A), R-hat(B), and R-hat(C) can be expressed by the following equations (2) to (4).

$$\hat{R}(A) = \begin{bmatrix} 1 & 0 & 0 \\ 0 & \cos(A) & -\sin(A) \\ 0 & \sin(A) & \cos(A) \end{bmatrix} \quad (2)$$

$$\hat{R}(B) = \begin{bmatrix} \cos(B) & 0 & \sin(B) \\ 0 & 1 & 0 \\ -\sin(B) & 0 & \cos(B) \end{bmatrix} \quad (3)$$

$$\hat{R}(C) = \begin{bmatrix} \cos(B) & -\sin(B) & 0 \\ \sin(B) & \cos(B) & 0 \\ 0 & 0 & 1 \end{bmatrix} \quad (4)$$

The converting unit 107 outputs vector values $r_{11}$, $r_{12}$, $r_{13}$, $r_{21}$, $r_{22}$, $r_{23}$, $r_{31}$, $r_{32}$, and $r_{33}$ of the position information acquired through the above-mentioned rotation matrix calculation to a second estimating unit 105. When calibration processing is being performed, the second estimating unit 105 sets, as an input to a neural network, the vector values $r_{11}$, $r_{12}$, $r_{13}$, $r_{21}$, $r_{22}$, $r_{23}$, $r_{31}$, $r_{32}$, and $r_{33}$ of the position information inputted from the converting unit 107. The second estimating unit 105 performs learning to optimize the parameters in an intermediate layer of the neural network in order to approximate an output of the neural network to a teaching signal.

Further, when a robot 2 is caused to normally operate, the second estimating unit 105 sets, as the input to the neural network, the vector values $r_{11}$, $r_{12}$, $r_{13}$, $r_{21}$, $r_{22}$, $r_{23}$, $r_{31}$, $r_{32}$, and $r_{33}$ of the position information inputted from the converting unit 107. The second estimating unit 105 acquires, as the output of the neural network, a difference ($\Delta F_X$, $\Delta F_Y$, $\Delta F_Z$, $\Delta M_A$, $\Delta M_B$, $\Delta M_C$), like that of Embodiment 1.

Next, examples of the hardware configuration of the calibration device 100A will be explained. An explanation of the same components as those of Embodiment 1 will be omitted hereinafter.

The converting unit 107 in the calibration device 100A is either the processing circuit 100b shown in FIG. 5A or the processor 100c shown in FIG. 5B that executes a program stored in the memory 100d.

Figure 13:
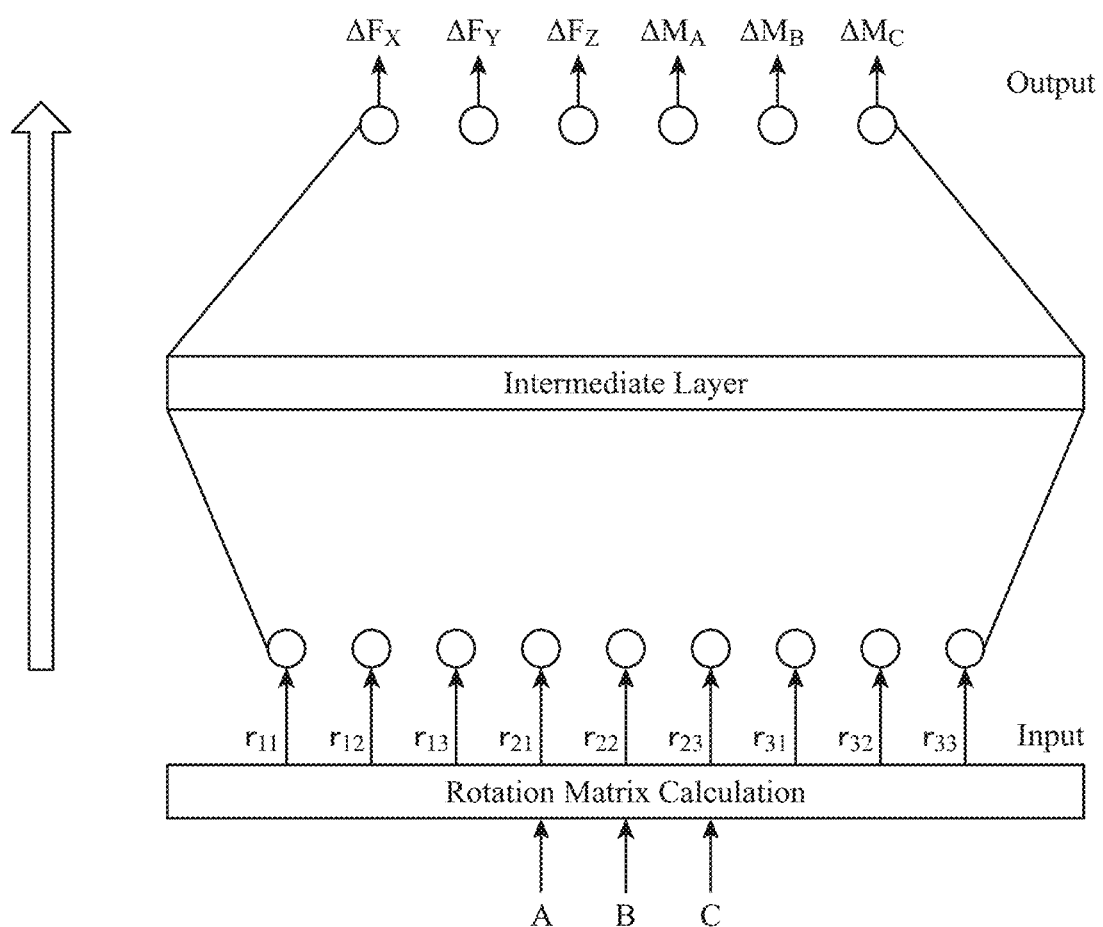
FIG. 13 is a diagram showing an example of a neural network in a second estimating unit of the calibration device according to Embodiment 2, and a learning rule for the neural network.

FIG. 13 is a diagram showing an example of the neural network in the second estimating unit 105 of the calibration device 100A according to Embodiment 2, and a learning rule for the neural network.

The vector values ($r_{11}$, $r_{12}$, $r_{13}$, $r_{21}$, $r_{22}$, $r_{23}$, $r_{31}$, $r_{32}$, $r_{33}$) of the position information that are acquired by performing the rotation matrix calculation on the position information [A, B, C] are inputted to an input layer. The difference ($\Delta F_X$, $\Delta F_Y$, $\Delta F_Z$, $\Delta M_A$, $\Delta M_B$, $\Delta M_C$) is outputted from an output layer. In the course of the learning of the neural network, the second estimating unit 105 optimizes the parameters in the intermediate layer in order to approximate the output value of the output layer that is acquired, via the intermediate layer, from the inputted vector values to the teaching signal, i.e., the difference between estimated force information and force information.

In FIG. 13, the explanation is made by taking, as an example, the case in which a force sensor 5 is a 6-axis sensor, and the direction of movement of a robot arm 1, and the orientation and rotation of the robot arm can be detected. On the other hand, the force sensor 5 may be a 3-axis sensor, and the structure of the sensor can be set up as appropriate. The output of the neural network can be set as appropriate on the basis of the structure of the force sensor 5.

Figure 14:
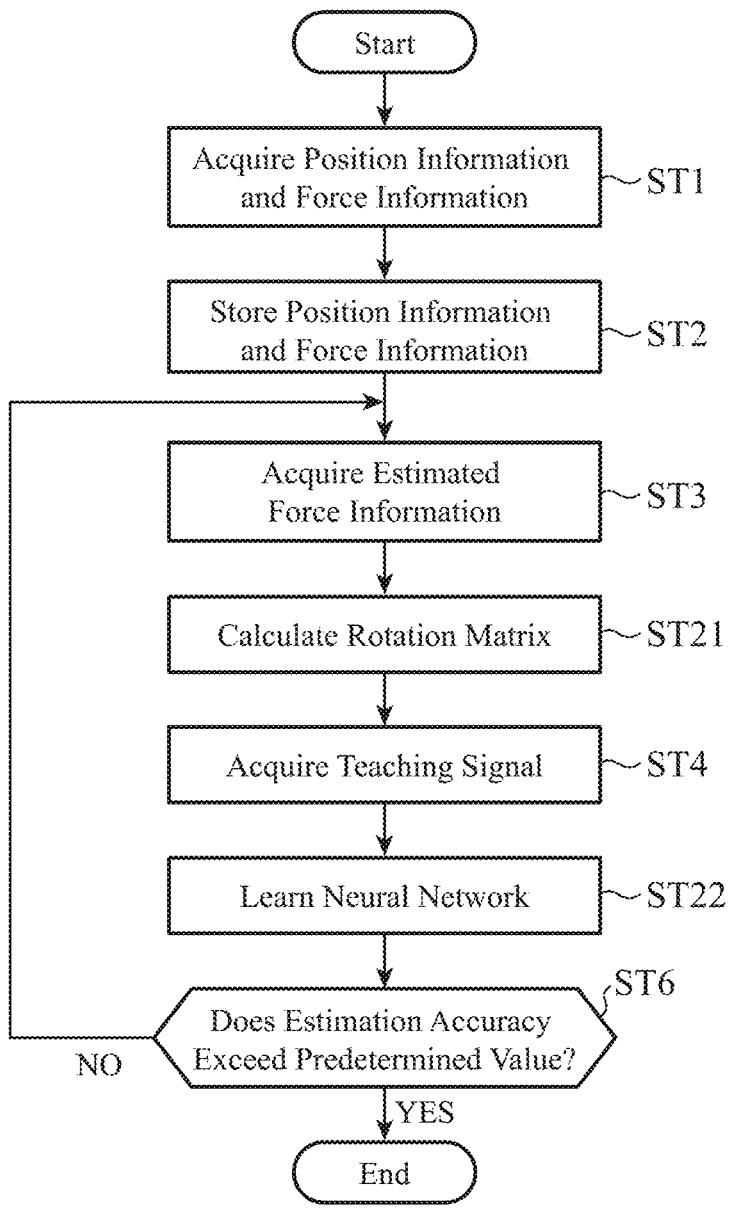
FIG. 14 is a flowchart showing the operation of the calibration device according to Embodiment 2 at a time of calibration processing.

FIG. 14 is a flowchart showing the operation of the calibration device 100A according to Embodiment 2 at the time of the calibration processing.

Hereinafter, the same steps as those of the calibration device 100 according to Embodiment 1 are denoted by the same reference signs as those used in FIG. 6, and an explanation of the steps will be omitted or simplified.

The converting unit 107 performs the rotation matrix calculation by using the position information [A, B, C]$^T$ stored in the information storage unit 103, to acquire the vector values ($r_{11}$, $r_{12}$, $r_{13}$, $r_{21}$, $r_{22}$, $r_{23}$, $r_{31}$, $r_{32}$, $r_{33}$) of the position information (step ST21). The converting unit 107 outputs the vector values ($r_{11}$, $r_{12}$, $r_{13}$, $r_{21}$, $r_{22}$, $r_{23}$, $r_{31}$, $r_{32}$, $r_{33}$) of the position information to the second estimating unit 105.

The second estimating unit 105 calculates the difference between the estimated force information acquired in step ST3 and the force information $F_X$, $F_Y$, $F_Z$, $M_A$, $M_B$, $M_C$ stored in the information storage unit 103, to acquire a teaching signal (step ST4). The second estimating unit 105 sets, as the input to the neural network, the vector values ($r_{11}$, $r_{12}$, $r_{13}$, $r_{21}$, $r_{22}$, $r_{23}$, $r_{31}$, $r_{32}$, $r_{33}$) of the position information inputted from the converting unit 107, and performs the learning of the neural network to perform the optimization of the parameters in the intermediate layer, the optimization being intended to approximate the output of the neural network to the teaching signal acquired in step ST4 (step ST22). After that, the flowchart advances to a process of step ST6.

FIG. 15 is a flowchart showing the operation of the calibration device 100A according to Embodiment 2 when the robot 2 is normally operating.

Hereinafter, the same steps as those of the calibration device 100 according to Embodiment 1 are denoted by the same reference signs as those used in FIG. 8, and an explanation of the steps will be omitted or simplified.

The converting unit 107 performs the rotation matrix calculation by using the position information $[A, B, C]^T$ stored in the information storage unit 103, to acquire the vector values ($r_{11}$, $r_{12}$, $r_{13}$, $r_{21}$, $r_{22}$, $r_{23}$, $r_{31}$, $r_{32}$, $r_{33}$) of the position information (step ST31). The converting unit 107 outputs the acquired vector values ($r_{11}$, $r_{12}$, $r_{13}$, $r_{21}$, $r_{22}$, $r_{23}$, $r_{31}$, $r_{32}$, $r_{33}$) of the position information to the second estimating unit 105.

The second estimating unit 105 inputs the vector values ($r_{11}$, $r_{12}$, $r_{13}$, $r_{21}$, $r_{22}$, $r_{23}$, $r_{31}$, $r_{32}$, $r_{33}$) of the position information acquired in step ST31 to the input layer of the learned neural network, and acquires, as the output, the difference $\Delta F_X$, $\Delta F_Y$, $\Delta F_Z$, $\Delta M_A$, $\Delta M_B$, $\Delta M_C$ (step ST32). The second estimating unit 105 outputs the acquired difference $\Delta F_X$, $\Delta F_Y$, $\Delta F_Z$, $\Delta M_A$, $\Delta M_B$, $\Delta M_C$ to the control amount calculating unit 106. After that, processes in steps ST15 to ST17 are performed.

Calibration results provided by the calibration device 100A will be explained by referring to FIG. 16.

FIG. 16 is a diagram showing calibration results provided by the calibration device 100 according to Embodiment 2.

In FIGS. 16A to 16F, a first line segment shows a result of performing the calibration by estimating the force information by using a mass point model, a second line segment shows a result of performing the calibration by both estimating the force information by using the mass point model, and using the neural network, and a third line segment shows a result of performing the calibration by using the neural network after performing both an estimation of the force information by using the mass point model, and the rotation matrix calculation.

Figures 16A, 16B, 16C:
FIGS. 16A to 16F are diagrams showing calibration results provided by the calibration device according to Embodiment 2.

Further, FIG. 16A shows the force information $F_X$ in a direction of the X axis, FIG. 16B shows the force information $F_Y$ in a direction of the Y axis, and FIG. 16C shows the force information $F_Z$ in a direction of the Z axis. In addition, FIG. 16D shows a moment $M_X$ around the X axis, FIG. 16E shows a moment $M_Y$ around the Y axis, and FIG. 16F shows a moment $M_Z$ around the Z axis.

Figures 16D, 16E, 16F:
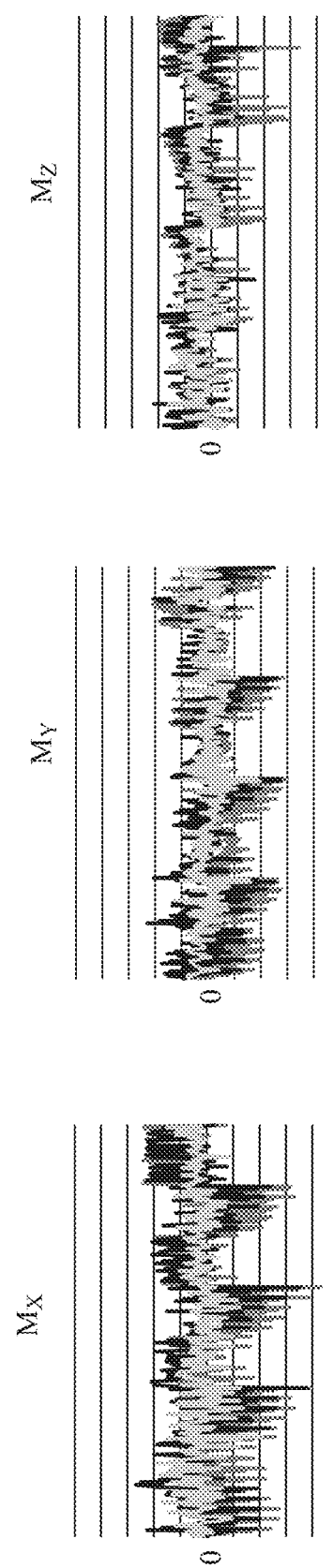

FIG. 16 shows the difference that is the output acquired by inputting the position information to the learned neural network when the robot 2 is moved, like that of Embodiment 1. Further, FIG. 16 shows the difference when the robot 2 moves in a state in which an end effector 3 of the robot 2 is not in contact with any workpiece. Therefore, it can be determined from FIG. 16 that the closer the value of the difference is to "0", the better calibration result is acquired. In all of FIGS. 16A to 16F, it is shown that the best calibration result is acquired in the case, shown by the third line segment, in which the calibration is performed by using the neural network after both an estimation of the force information by using the mass point model and the rotation matrix calculation are performed.

Although the case in which the converting unit 107 performs the rotation matrix calculation on the position information to convert the position information into a vector is shown above, the converting process is not limited to the rotation matrix calculation.

In the converting unit 107, any type of process can be applied as long as the process is one of performing conversion of numerical values, the number of which is equal to or greater than 1 in such a way as to provide a representation that does not include, in the domains of the position information expressed by Euler representation, any discontinuity of numerical value showing the position information.

For example, a process of adding 360 degrees to the angle in the domain $\theta_2$ (ranging from 0 degrees to −180 degrees) shown in FIG. 11 in the domains of the position information expressed by Euler representation, and converting the angle range into a range from 180 degrees to 360 degrees is applied. As a result, the angle range becomes one from 0 degrees to 360 degrees in the domains $\theta_1$ and $\theta_2$ of the position information which are shown in the example of FIG. 11, so that the numerical discontinuity at the boundary point P between the domain $\theta_1$ and the domain $\theta_2$ is eliminated.

As mentioned above, according to this Embodiment 2, because the converting unit 107 that converts the position information acquired by a position information acquiring unit 101 into a continuous numeric representation including no discontinuity is included, the calibration processing can be performed continuously on the conversion of the position information without being affected by discontinuities of position information.

Although in above-mentioned Embodiments 1 and 2, the configuration in which the information storage unit 103 that stores the position information acquired by the position information acquiring unit 101 and the force information acquired by the force information acquiring unit 102 is included is shown, a configuration in which the information storage unit 103 is not included may be provided. In that case, the position information acquiring unit 101 and the force information acquiring unit 102 may be configured so as to output the pieces of information directly to a component to which the pieces of information should be outputted, the component being one of the first estimating unit 104, the second estimating unit 105, and the converting unit 107.

In above-mentioned Embodiments 1 and 2, the configuration in which when the calibration processing is performed, the position information acquiring unit 101 acquires the position information, the force information acquiring unit 102 acquires the force information, and the pieces of information are stored in the information storage unit 103 is shown. A configuration may be provided in which the robot 2 is moved in uniform motion when the calibration device 100 acquires the position information and the force information. By causing the robot 2 to perform uniform motion, information that does not need to take the influence of the inertia force into consideration can be acquired. Further, because it is not necessary to take the influence of the inertia force into consideration, the position information and the force information can be acquired without stopping the motion of the robot 2.

Further, in the above-mentioned Embodiments 1 and 2, each of the calibration devices 100 and 100A may have a configuration to update the neural network on the basis of information including a change of the installed environment of the robot 2 and a secular change of the end effector 3 or the like of the robot 2. For example, each of the calibration devices 100 and 100A acquires information about the control target equipment, the information including the temperature or humidity of the environment where the robot 2 is installed, or the degree of wear of the end effector 3. When performing the learning of the neural network, the second estimating unit 105 also refers to the acquired information about the control target equipment and performs the learning of the neural network.

As a result, the learning of the neural network in consideration of the installed environment of the robot 2 and the secular change of the robot 2 or the like can be performed, and the high-accuracy calibration processing can be performed.

It is to be understood that, in addition to the above-mentioned embodiments, an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the present disclosure.

INDUSTRIAL APPLICABILITY

The calibration device according to the present disclosure can be applied to devices that are used in order to control an arm type robot that performs work while controlling a force, and that control the arm type robot that needs high-accuracy operations.

REFERENCE SIGNS LIST 100, 100A calibration device, 101 position information acquiring unit, 102 force information acquiring unit, 103 information storage unit, 104 first estimating unit, 105 second estimating unit, 106 control amount calculating unit, and 107 converting unit.

The invention claimed is:

1. A calibration device comprising:
processing circuitry to perform a process to:
acquire position information showing a position and a posture of control target equipment which constructs a device performing a force control and has at least either of a changing position and a changing posture; acquire information about a force applied to the control target equipment from a detection result of a force sensor disposed in the control target equipment;
estimate the force applied to the control target equipment from the position information acquired by using a physical model, to acquire estimated force information;
estimate a difference between estimated force information and force information using a linear or nonlinear model on a basis of the position information acquired, the force information acquired, and the estimated force information acquired when the control target equipment is not contact with other objects;
set the position information acquired as an input to a neural network and sets a difference between the estimated force information acquired and the force information acquired as a teaching signal for the neural network, and performs learning of the neural network, the neural network being utilized as the linear or nonlinear model,
wherein the physical model is separate from the linear or nonlinear model.

2. The calibration device according to claim 1, wherein the process includes to convert the position information acquired into a continuous numeric representation including no discontinuity.

3. The calibration device according to claim 2, wherein
the process converts the position information to vectors by performing rotation matrix calculation on the position information acquired.

4. The calibration device according to claim 1, wherein the process acquires the position information and the force information about the control target equipment that performs uniform motion.

5. The calibration device according to claim 1, wherein the process refers to information about the control target equipment, to estimate a difference between the estimated force information and the force information using the linear or nonlinear model.

6. The calibration device according to claim 5, wherein
information regarding the control target equipment is a degree of wearing of end effector.

7. A calibration method comprising:
acquiring position information showing a position and a posture of control target equipment;
acquiring information about a force applied to the control target equipment from a detection result of a force sensor disposed in the control target equipment;
estimating the force applied to the control target equipment from the acquired position information, to acquire estimated force information;
estimating a difference between estimated force information and force information using a linear or nonlinear model on a basis of the acquired position information, the acquired force information, and the acquired estimated force information, when control target equipment is not contact with other objects;
setting the position information acquired as an input to a neural network and setting a difference between the estimated force information and the force information as a teaching signal for the neural network; and
performing learning of the neural network, the neural network being utilized as the linear or nonlinear model,
wherein the physical model is separate from the linear or nonlinear model.

8. A control device comprising:
processing circuitry to perform a process to:
calculate a control amount for the control target equipment from an output of a difference between estimated force information estimated using the linear or nonlinear model by the process of the calibration device according to claim 1, and force information, the estimated force information acquired, and the force information acquired; and
control the control target equipment on a basis of the control amount calculated.

* * * * *